W. WARNE.
Hooks and Clevises.

No. 148,905. Patented March 24, 1874.

Witnesses:

Inventor:
W. Warne
Per
Attorneys.

UNITED STATES PATENT OFFICE.

WILLIAM WARNE, OF HUNTINGTON MINE, DILLONTON P. O., CANADA.

IMPROVEMENT IN HOOKS AND CLEVISES.

Specification forming part of Letters Patent No. 148,905, dated March 24, 1874; application filed January 31, 1874.

*To all whom it may concern:*

Be it known that I, WILLIAM WARNE, of Huntington Mine, Dillonton Post-Office, in the Province of Quebec and Dominion of Canada, have invented a new and useful Improvement in Hook and Clevis, of which the following is a specification:

The object of this invention is to so construct a hook and clevis that they cannot be readily disconnected when in use; and it consists of one or more grooves in the clevis, and in one or more lugs on the hook, arranged to operate as hereinafter described, by means of which the hook and the clevis are made to form a safe connection.

Figure 1:
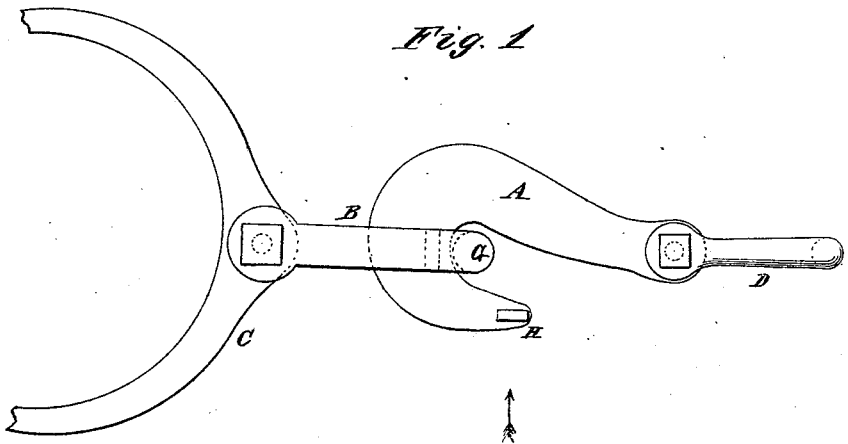
Figure 2:
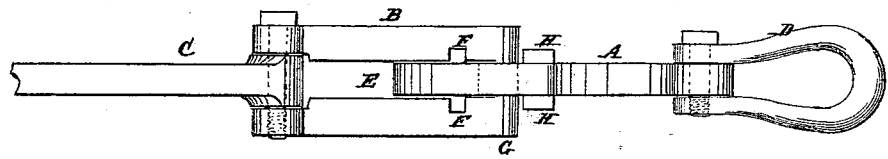

In the accompanying drawing, Figure 1 represents a side view; and Fig. 2, a top view, showing the hook and clevis, in both cases, as when in use.

Similar letters of reference indicate corresponding parts.

A is the hook; B, the clevis. C is a yoke, by means of which the clevis is attached to any object, but forms no part of my invention. D is a small clevis attached to the hook, for connecting a chain or rope with the hook. E is the interior of the clevis, which is designed to admit the hook loosely.

The feature which distinguishes this hook and clevis from others is the device for preventing accidental separation of the two when they are in use. For this purpose I make two slots or grooves, F F, through the clevis and near the wrist G, as indicated in dotted lines in Fig. 1, and shown in Fig. 2. On the sides of the hook, near the end, I form two lugs, H H, which, when the hook is turned in a certain position, will pass readily through the slots or grooves F F, which allows the hook and clevis to be separated.

When in ordinary use for any purpose, the hook and clevis cannot assume that position, but remain united without reference to the side that is uppermost. Instead of two grooves and two lugs, a single groove in the clevis, and a single lug on the hook, may be made to answer the purpose; but I prefer the two, as shown.

I do not confine myself to the precise arrangement shown of either the grooves or lugs in the clevis or on the hook.

This hook and clevis is designed for all the purposes to which it may be applicable, and is intended as a safeguard against accidents when horse or other motive power is applied.

Having thus described my invention, I claim as new and desire to secure by Letters Patent—

A hook and clevis, constructed substantially as shown and described—that is, with one or more grooves in the clevis, and one or more lugs on the hook—for the purposes specified.

WILLIAM WARNE.

Witnesses:
JOHN RODDA,
WALTER WILLIAM DAVIES.